Nov. 11, 1969  E. WILDHABER  3,477,316
GEAR DRIVE WITH COAXIAL INPUT AND OUTPUT MEMBERS
Filed Dec. 26, 1967  3 Sheets-Sheet 2
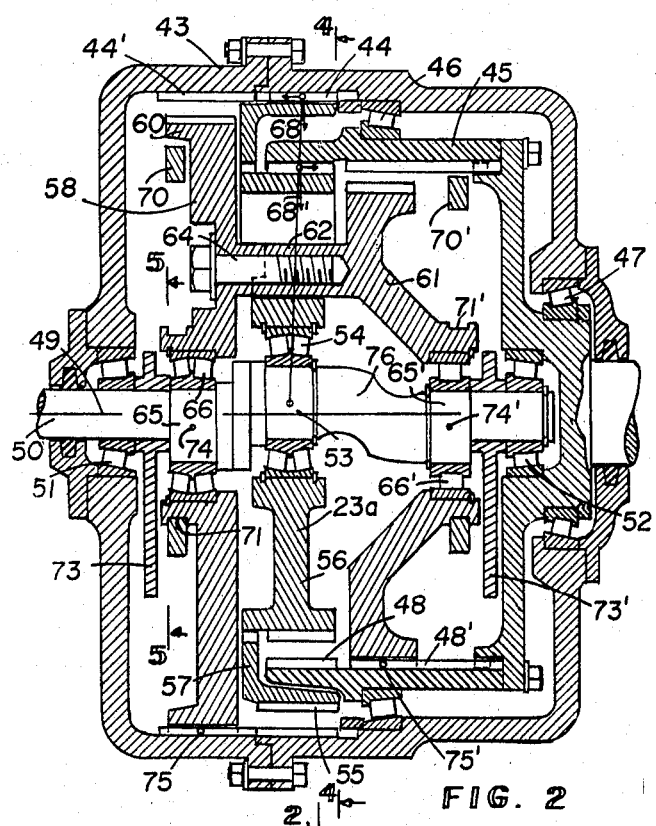
INVENTOR:
Ernest Wildhaber Nov. 11, 1969      E. WILDHABER      3,477,316
GEAR DRIVE WITH COAXIAL INPUT AND OUTPUT MEMBERS
Filed Dec. 26, 1967      3 Sheets-Sheet 3
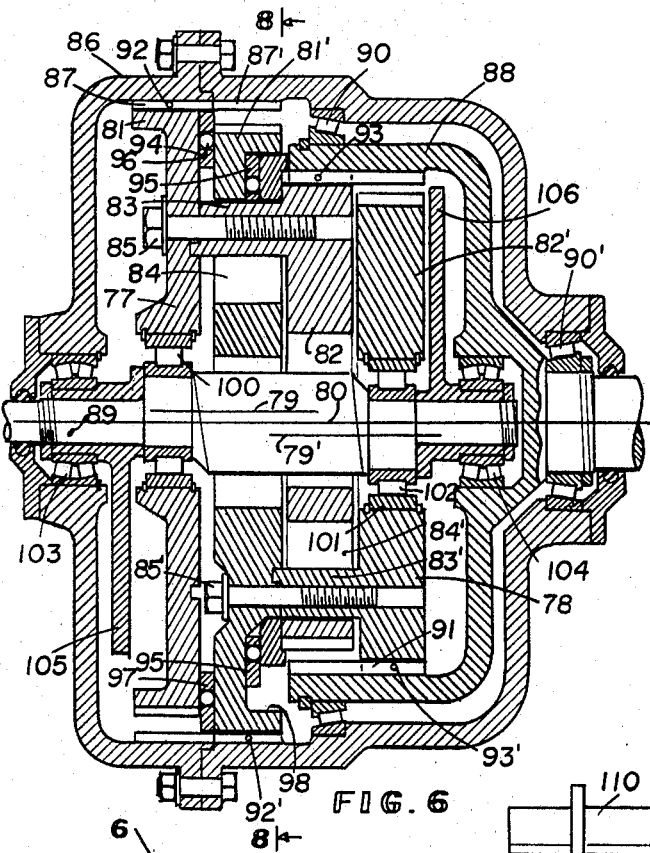
FIG. 6
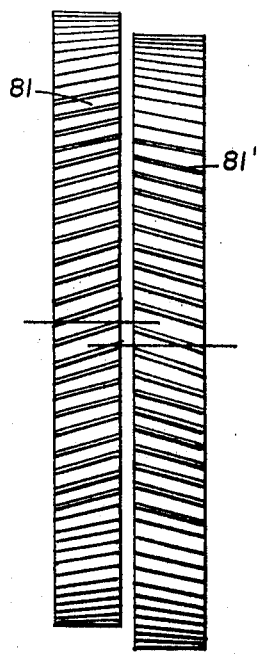
FIG. 7
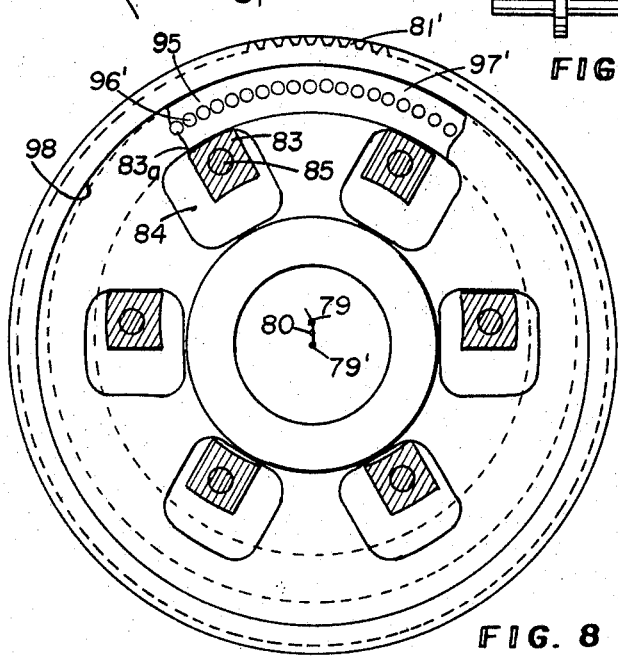
FIG. 8
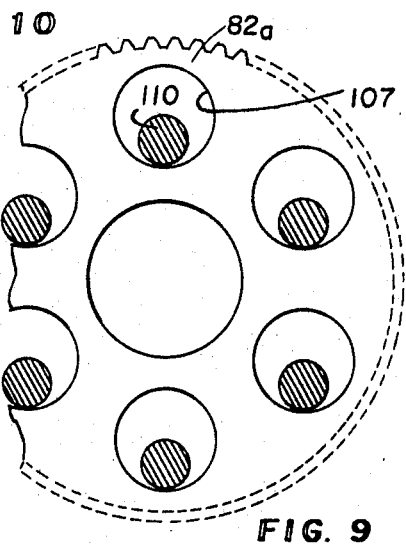
FIG. 10
FIG. 9
INVENTOR:
Ernest Wildhaber United States Patent Office 3,477,316
Patented Nov. 11, 1969

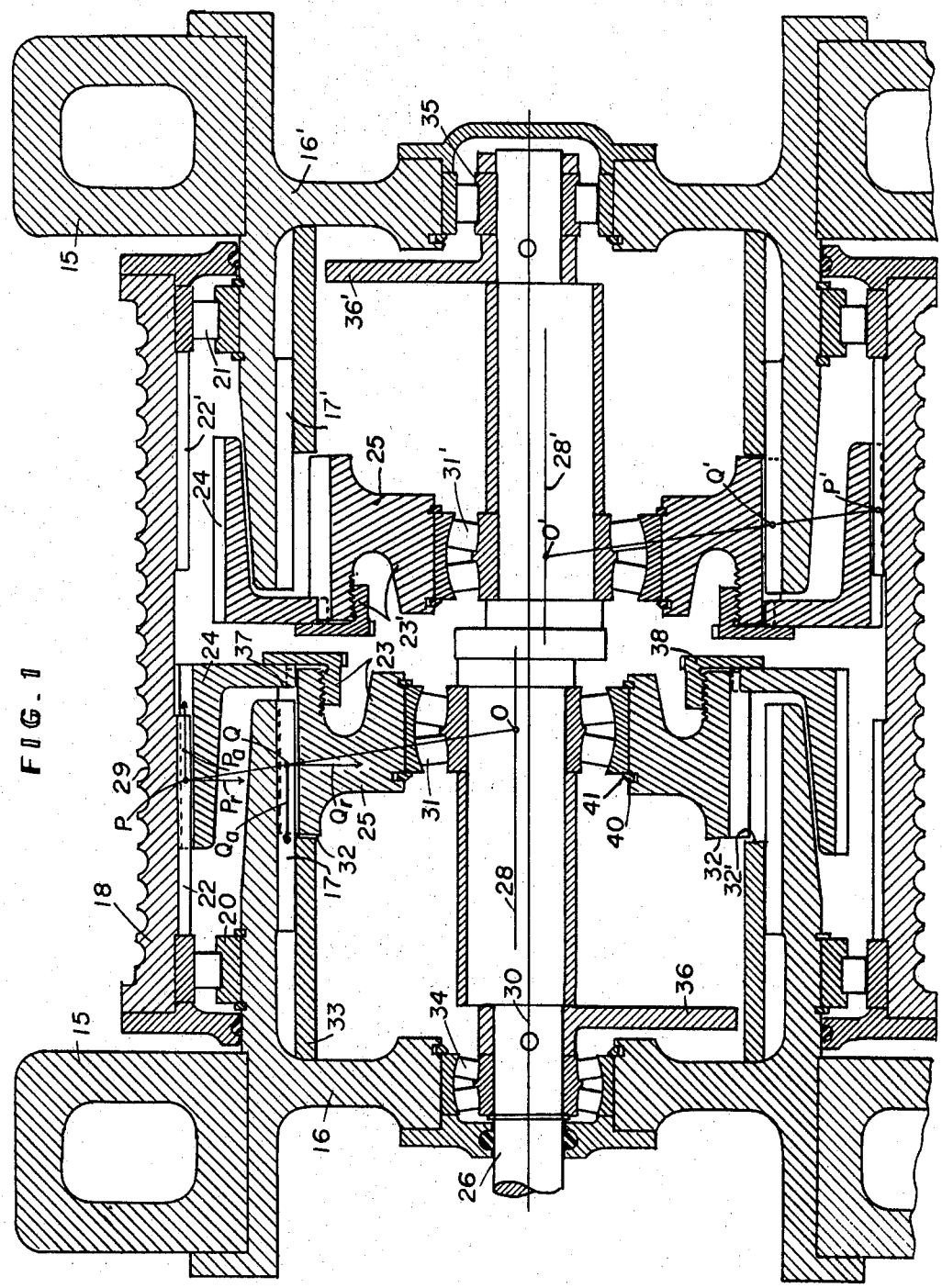

3,477,316
GEAR DRIVE WITH COAXIAL INPUT
AND OUTPUT MEMBERS
Ernest Wildhaber, Brighton, N.Y.
(124 Summit Drive, Rochester, N.Y. 14620)
Filed Dec. 26, 1967, Ser. No. 693,464
Int. Cl. F16h 1/32, 57/00
U.S. Cl. 74—805          17 Claims

ABSTRACT OF THE DISCLOSURE

The invention relates to gear drives with internal gears and driving and driven members that have a common axis. The internal gears are engaged in axially spaced regions by two pairs of external gears having the same two tooth numbers slightly smaller than those of their internal mates. Said two pairs are mounted on axes parallel to said common axis and equally offset therefrom in opposite directions. Helical teeth of opposite hand may be provided on corresponding gears of said two pairs and their mates, together with floating mounting, to positively equalize the loads on both pairs. The two pairs may be kept together axially and in parallel planes by thrust bearings whose balls contact both pairs directly.

---

The present invention can be considered an extension and improvement of the gear drive described in my pending patent application Ser. No. 627,782, filed Apr. 3, 1967. It overcomes the difficulties inherent in using two pairs of external gears to transmit the same motion in drives of this kind, and uses two pairs rather than the single pair of the prior disclosure. Also it modifies the pairs.

One object is to decrease the large load on fast-running bearings, to thereby reduce the energy loss therein and to decrease the bearing cost. A further aim is to achieve a design of smaller diameter. A still other object is to provide a structure that applies driving load at two diametrically opposite regions, whereby to transmit pure torque rather than applying a single force. A still other aim is to simplify mass-balance. Other aims will appear in the course of the specification and in the recital of the appended claims.

Embodiments of the invention will be described with the drawings, in which

FIG. 1 is an axial section of a planetary drive whose driven member is a drum enclosing the drive.

FIG. 2 is an axial section of a second embodiment, taken along lines 2—2 of FIG. 4.

FIG. 3 is a side view of gear 61 of FIG. 2, taken at right angles to its axis.

FIG. 4 is an axial view of the gear pair 55, 56 of FIG. 2, and partly a section along lines 4—4 of FIG. 2.

FIG. 5 is a section along lines 5—5 of FIG. 2 and a view taken in the direction of the arrows.

FIG. 6 is an axial section of a further embodiment, taken along lines 6—6 of FIG. 8.

FIG. 7 is a side view of the gears 81, 81' shown in FIG. 6, taken at right angles to their axes.

FIG. 8 is an axial view of gear 81' and a section along lines 8—8 of FIG. 6.

FIG. 9 illustrates a modified connection between a gear pair in an axial view of a planet gear and a section perpendicular to the gear axis.

FIG. 10 is a side view of a detail.

In FIG. 1 numeral 15 denotes a relatively stationary or non-rotatable frame, to which are rigidly secured from opposite sides two cup members 16, 16' containing gear teeth 17, 17' internally provided thereon. These stationary parts constitute one element of the drive. Another element is a drum 18 rotatably mounted on said cup members by two bearings 20, 21 permitting some axial floating of the drum. Drum 18 contains two sets of teeth 22, 22' internally provided thereon. They are helical teeth of opposite hand and equal lead.

Two planet members are provided. Each planet member has two sets of external teeth constituting gears 24 and 25. The gears 24 of the two planet members mesh with the internal sets of teeth 22, 22', respectively, of the drum 18. The gears 25 of the two planet members mesh with the internal teeth 17, 17', respectively, of the stationary cup members 16, 16'. The sets of teeth 22, 22' are axially spaced from one another, as are the sets of teeth 17, 17', so that the gears 24 engage the internal teeth 22, 22' in axially spaced regions; and similarly the gears 25 engage the internal teeth 17, 17' in axially spaced regions. The two gears 24, 25 of each pair are rigid with each other and their respective planet members and their tooth numbers differ moderately from the tooth numbers of their internal mates.

A drive shaft 26 is coaxial with the gears constituted by the teeth 17, 17' and 22, 22'. It represents a third element of the drive. The two planets 23, 23' and the two pairs of external gears 24, 25, which are secured thereto, are rotatably mounted respectively on axes 28, 28' parallel to axis 30 of the drive shaft 26 and equally offset therefrom in opposite directions. Single bearings 31, 31' and the tooth engagement so mount them.

On planet member 23 P is the mean point of mesh of gear 24 with the teeth 22, while Q is the mean point of mesh of gear 25 with the teeth 17. Bearing 31 is a spherical bearing with center O. It lets the planet adjust itself about center O so that the tooth loads are centered at mean points P and Q. It will now be shown how this is accomplished.

The peripheral tooth load components at P and Q are perpendicular to the plane of the drawing. They are the driving loads. Then there are radial load components $P_r$, $Q_r$ and axial thrust components $P_a$, $Q_a$. Equilibrium requires that points O, P, Q lie on a straight line, and that the moment about center O exerted by radial components $P_r$, $Q_r$ is equal and opposite to the moment about O exerted by the axial thrust components $P_a$, $Q_a$. This is accomplished by an inclination of line OP to planes perpendicular to axis 30, that is to vertical planes in the drawing. Also the center of gravity of the planet should be at O to avoid unbalance through centrifugal inertia loads. The symmetrical bearing 31 shown calls for little or no resultant axial thrust load. This means that $Q_a$ should be equal and opposite to $P_a$. This is attained with helical teeth of the same hand and the same lead on both gears 24, 25 of pair 23.

Fulfilment of these requirements keeps the tooth loads centered at P and Q respectively, at the center of the intermeshed teeth. This is attainable even without crowning the teeth. It provides maximum utilization of the teeth and maximum strength.

What has been said with respect to planet member 23 and its gear pair 24, 25 also applies to planet member 23 and its gear pair 24, 25. Here the bearing center is at O' and the tooth loads are centered at P', Q'. More about the principles of self-adjustment is found in my pending patent application Ser. No. 627,782.

Should the loads occasionally reverse, the axial thrust loads $P_a$, $Q_a$ also reverse, and their moment with respect to center O adds to the moment exerted by the radial components $P_r$, $Q_r$. The planet then tips very slightly about O to move side 32 of gear 25 into contact with the face 32' of a stationary ring 33, chiefly rolling thereon. This contact takes up the moment. To retain central tooth contact also with reversed load, I may cut the tooth sides contacting at reversed load for the slightly modified mounting position. Or I may crown the last-named tooth sides.

The drive shaft 26 is rotatably mounted on two bearings 34, 35 in the stationary element constituted by cup members 16, 16' and frame 15. Their axial spacing is much larger than that of the bearings 31, 31', which carry equal and opposite loads. In consequence the load on bearings 34, 35 is much smaller. Similarly only small counter-weights 36, 36' are required to balance the opposite and equal centrifugal inertia loads of the planets and eccentric shaft portions.

As already mentioned, gears 24, 25 are rigid with each other and form a planet. Usually they are made in two pieces rigidly secured together. In the instance illustrated the gear 24 contains internal teeth of reduced depth at the inner end of its flange portion, which match the lower portions of the teeth of external gear 25. It is pressed against a shoulder 37 formed by the upper portions of the last-named teeth, by a part 38 whose external thread engages an internal thread provided on gear 25. Any other known rigid connection might also be used instead.

For easy axial assembly I may use some snap rings 40 with tapered sides 41 to hold bearing races in place. Extra depth grooves let the rings become completely submerged therein when pressure is applied on sides 41 in assembly.

In this embodiment the use of a pair of opposite planets is made possible by separating the two gears of the stationary element and connecting them to the frame at axially opposite sides thereof.

Drum 18 may be used on hoists or elevators. It contains helical grooves 29 for receiving and holding a steel cable. The load is here primarily in one direction.

FIGURES 2 to 8 illustrate applications of the invention to embodiments where the driven member is enclosed by an outer member, which on planetary drives is stationary.

A SECOND EMBODIMENT

In the embodiment to be described with FIGURES 2 to 5 the stationary housing 43 contains two sets of gear teeth 44, 44' internally provided thereon. It is made in two parts rigidly secured together and represents one of the elements of the drive. The sets 44, 44' contain helical teeth of opposite hand and equal lead. They have equal tooth numbers.

A second element 45 has a common axis 49 with the gear sets 44, 44' and is rotatably mounted in housing 43 by bearings 46, 47. It is the low-speed or driven member and contains two sets 48, 48' of helical gear teeth internally provided thereon side by side. The two sets have equal tooth numbers and opposite hand.

A high-speed shaft or drive shaft 50 constitutes a third element. It is rotatably mounted on bearing 51 in housing 43 and on bearing 52 in element 45, to turn about common axis 49.

A planet $23_a$ is much like planet 23 of FIG. 1. It is rotatably mounted on eccentric portion 53 of drive shaft 50 by means of a spherical bearing 54. Planet $23_a$ comprises two external gears 55, 56 rigid with each other and in mesh with the internal teeth 44 and 48 respectively. They have helical teeth of the same hand and the same lead. The flange 57 of gear 55 contains internal teeth matching the external teeth of gear 56.

Another planet 58 contains two axially spaced gears 60, 61. Their tooth numbers are like those of gears 55, 56 respectively. Gears 60, 61 are rigidly secured together with projections 62 reaching through openings 63 provided in gear 56 (FIG. 4). Openings 63 are wider peripherally than radially. Screws 64 thread into projections 62. The gears 60, 61 mesh with the internal teeth 44' and 48' respectively. Planet 58 is mounted to rotate on eccentric drive-shaft portions 65, 65' by means of bearings 66, 66'. The eccentric portions 53 and 65, 65' have axes parallel to the common axis 49 and equally offset therefrom in opposite directions.

The tooth numbers of the gears 55, 56 are moderately smaller than the tooth numbers of the mating gear sets 44, 48 respectively, the tooth number difference being preferably smaller on the smaller gear pair 56, 48 and smaller than one eighth of the tooth number of its internal mating gear. This results in a coarser pitch on the smaller pair, as shown with exaggeration in FIG. 4. The smaller pair has the larger tooth load. A coarser pitch is the best answer, as it is impractical to provide a wider face. The change of pitch can however only be applied in connection with the tooth number difference.

The planet bearings 54 and 66, 66' carry a combined load composed of a peripheral load component perpendicular to the drawing plane and a radial load in the drawing plane. The axial load components may be kept equal and opposite, so that they cancel out. The radial load is the difference of the added radial tooth load components 68, 68' from the centrifugal inertia load of the planet. At high speed the latter may be much larger, especially on the heavier planet 58. I may decrease this extra load on planet 58 by the use of eccentric rings 70, 70' rolling in circular raceways 71, 71' of planet 58 and pulling in a direction opposite to its centrifugal inertia load. The rings are guided by the raceways 71, 71' and by rollers 72 (FIG. 5) mounted on holders 73, 73' secured to drive shaft 50. They are dimensioned so that the remaining inertia pull of planet 58 just balances the opposite centrifugal inertia pull of planet $23_a$.

On planet bearing 54 the peripheral load component is the moderate driving load at the eccentric. Bearings 66, 66' however carry an additional peripheral load component due to the axial distance of the two mesh zones of planet 58. This additional component is here reduced by spreading the bearings 66, 66' axially so that the distance between the centers 74, 74' of the bearings is larger than the axial distance between the centers 75, 75' of the two mesh zones of planet 58, and by displacing the point midway between the bearing centers 74, 74', axially towards the smaller gear 61 from the point midway between the two mesh zones. In FIG. 2 this displacement to the right is large enough that bearing center 74' is axially beyond the teeth of gear 61. The bearings 54, 66' then have an ample distance from each other. This permits providing such an S-shape on portion 76 of the drive shaft that bearing 54 can be moved over it to its final position.

The load sharing of the two planets $23_a$, 58 depends on the axial position of element 45. The best position for load sharing may be determined on a test stand that permits axial adjustment of element 45. This position is duplicated in the final axial position of bearings 46, 47.

FURTHER EMBODIMENT

A further embodiment will now be described with FIGS. 6 to 8, at first as applied to a planetary drive. It also contains two planets, 77 and 78, rotatably mounted on eccentric portions of drive shaft 89. The portions have axes 79, 79' parallel to axis 80 of drive shaft 89 and equally offset therefrom in opposite directions. Both planets here contain two axially spaced gears rigid with each other. The two gears 81, 82 of planet 77 are connected by projections 83 of gear 82, reaching through openings 84 provided in gear 81'. Screws 85 rigidly fasten them together.

Two gears 81', 82' of planet 78 have the same tooth numbers as gears 81, 82 respectively, and are connected by projections 83' of gear 82'. The projections reach through openings 84' provided in gear 82. They are fastened to gear 81' by screws 85'. Housing 86 constitutes the stationary element of the drive. It is made up of two parts rigidly secured together. Each part contains a set of helical gear teeth 87, 87' internally provided thereon. The two sets have equal tooth numbers, equal lead but opposite hand. They are coaxial with drive shaft 89. A second element 88 is mounted in housing 86 by bearings 90, 90' to rotate about axis 80. It is cup-shaped and contains wide-faced gear teeth 91 internally provided thereon. Teeth 91 may be straight and parallel to axis 80.

The planet gears mesh with the internal teeth in axially spaced zones or regions. Planet 77 has mesh zones centered at points 92, 93. The mesh zones of planet 78 are centered at points 92', 93'.

The energy-transmitting peripheral tooth load components exerted on the planets are perpendicular to the drawing plane of FIG. 6 and pass approximately through said points. At a given driving direction the one passing through point 92 extends upwardly, while the one at point 93 extends downwardly. They result in a moderate upward load exerted on planet 77 at its center and in a rather large turning moment about a radial axis that lies in the drawing plane, as can be demonstrated mathematically.

The peripheral tooth load components exerted on planet 78 are downward at point 92' and upward at point 93'. They result in a moderate downward load exerted at the planet center and in a comparatively large turning moment about a radial axis lying in the drawing plane. The said moments exerted on the two planets are opposite and equal.

The invention uses one to counteract and balance the other. A pair of opposite planetary thrust bearings 94, 95 keep the planets in planes perpendicular to their axes and prevent them from tilting. Bearings of this type have been described in my pending patent application entitled Planetary Motion Mechanism, Ser. No. 640,031, filed May 22, 1967, now Patent No. 3,413,896, granted Dec. 3, 1968. Their balls 96, 96' contact the two planets or parts rigid therewith directly, bearing against plane sides thereof. Cages 97, 97' keep the balls in position. They are centered on axis 80 (FIG. 8), while the planets have offset axes 79, 79'. Cage 97' contacts the cylindrical inside surface 98 provided on gear 81'. It also contacts or nearly contacts the cylindrical outside surface $83_a$ of projections 83. Similar conditions apply to cage 97.

As the two planets turn at the same speed, they do not turn relatively to each other, but merely perform a circular translation one with respect to the other. Likewise the ball centers perform a circular translation with respect to each planet, each ball center describing its own small circle in a plane perpendicular to axis 80. If desired to increase load capacity, the circular rolling paths may be formed as individual circular raceways of concave profile, as described in the last-named patent application.

Drive shaft 89 constitutes the third element of the gear drive. The two planets 77, 78 are mounted on oppositely eccentric portions of the drive shaft by single bearings 100, 101, taking support from one another through the planetary thrust bearings 94, 95. Radial bearings 100, 101 contain cylindrical rollers 102 and cylindrical outer raceways and permit moderate axial floating of the planets, that are tied together axially. The planets float to a position where the opposite axial thrust loads exerted on them by the opposite helical teeth 87, 87' are equal, that is when equal loads are transmitted through both sets of teeth 87, 87' and through both planets.

The drive shaft 89 is mounted on bearings 103, 104 in housing 86 and in element 88 respectively. Small counterweights 105, 106 serve for mass balance. They are secured to drive shaft 89.

Lubrication is effected in any suitable known way.

The embodiment described with FIGURES 6 to 8 permits to achieve reduction ratios up to very large figures directly, without doubling up, ratios such as 1000:1.

In a modification illustrated in FIGS. 9 and 10 circular holes 107 are provided in a planet gear $82_a$. The adjacent opposite planet gears are connected by flanged bolts 110 that reach through holes 107. The flanges 111 may be recessed in said opposite gears and the bolts 110 are rigidly secured thereto.

The described gearing can also be used as a speed-up drive. In the embodiment of FIGS. 6 to 8 element 88 is then the driving member and shaft 89 is the driven member.

The gearing can also be used with fixed axes for operatively connecting two high-speed elements to run at slightly different speeds. This requirement exists for instance in centrifuges, that is separators based on the difference of centrifugal inertia loads of two media. What was the drive shaft in planetary reduction drives then stands still in normal operation. But it is generally retained as a safety measure, to start running at a given excess load.

While the invention has been described with several embodiments thereof, further modifications may be made by simply applying current knowledge and customary practice of the art and without departing from its spirit. For definition of its scope it is relied on the appended claims.

I claim:

1. A gear drive comprising two elements, having different numbers of gear teeth internally provided thereon, and spaced about a common axis, at least one of said elements being rotatable about said common axis, a third element also rotatable about said common axis, two pairs of external gears disposed at different positions lengthwise of said axis, one gear of each pair meshing with the teeth of one of the first two elements, the other gear of each pair meshing with the teeth of the other of said first two elements, the two external gears of each pair being rigid with each other and having different tooth numbers, respectively, each of said two tooth numbers being the same on both said pairs, said two pairs of external gears being rotatably mounted on said third element on axes parallel to said common axis and equally offset therefrom in opposite directions and their diameters being large enough that said common axis lies inside their tooth zones, means for maintaining one of said three elements stationary, the remaining two elements being the driving and driven members, respectively.

2. A gear drive according to claim 1, wherein at least one of the first-named two elements contains two sets of helical teeth of opposite hand.

3. A gear drive according to claim 2, wherein the element of larger diameter of said two elements contains two sets of helical teeth of opposite hand and equal lead.

4. In a gear drive, two internal gears of different diameter having a common axis and axially overlapping teeth, two external gears rigid with each other and in mesh with said two internal gears respectively, said external gears being rotatably mounted on an axis parallel to and eccentric of said common axis by a single antifriction bearing, the line connecting the center of said bearing with the center of the intermeshed teeth of the smaller of said external gears being inclined to a plane perpendicular to said common axis, at least one of said external gears containing helical teeth.

5. The combination according to claim 4, wherein both external gears contain helical teeth, the teeth of both gears having the same hand and the same lead.

6. In a gear drive, two internal gears of different diameter having a common axis and axially overlapping teeth, two external gears rigid with each other and in mesh with said two internal gears respectively, forming two gear pairs therewith, said external gears being mounted on an axis parallel to and eccentric of said common axis, the gear pair of smaller diameter having a tooth-number difference between the internal and external gear smaller than the tooth-number difference of the gear pair of larger diameter and smaller than one eighth of the tooth number of its internal mating gear.

7. In a gear drive, two coaxial internal gears of different pitch diameter spaced from each other in the direction of their common axis, a shaft coaxial with said common axis, a larger and a smaller external gear rigid with each other and meshing with said two internal gears respectively, said external gears surrounding said common axis and being rotatably mounted on an eccentric portion of said shaft by two antifriction bearings, the distance between the centers of said two bearings being larger than the distance in axial direction between the centers of the two zones of mesh of said external and internal gears, and the point halfway between the two bearing centers being displaced axially towards said smaller gear from the plane of rotation halfway between the centers of the two mesh zones.

8. The combination according to claim 7, wherein the center of the bearing on the side of the smaller external gear lies in axial direction beyond the end of the teeth of said smaller gear.

9. A gear drive according to claim 1, wherein one of the two elements with internal gear teeth is maintained stationary while the other of said two elements is the low-speed member, the third element being the high-speed member of the planetary gear drive.

10. A planetary gear drive according to claim 9, wherein the driven member is a drum containing the larger number of internal gear teeth, the stationary gear member is made in two separated parts each containing internal gear teeth, said parts being connected through a frame and extending partly to the inside of said drum from opposite sides, the third element carries the external gears as planets and is the driving member.

11. A gear drive according to claim 1, wherein the two external gears of one of the two pairs are disposed on opposite sides of an external gear of the other pair and are connected with each other through openings provided in the last-named external gear.

12. A gear drive according to claim 11, wherein the openings in said external gear are wider peripherally than radially, said openings being arranged in a circle about the gear axis.

13. A gear drive according to claim 1, wherein the two pairs of external gears are connected through an antifriction thrust bearing whose rolling means bear directly against portions rigid with the two pairs respectively.

14. A gear drive according to claim 13, wherein the rolling means are balls held in place by a cage concentric with the common axis of said elements.

15. A gear drive according to claim 13, wherein two opposite antifriction thrust bearings are provided to hold the two pairs of external gears together axially in both directions, the rolling means of said bearings acting directly against portions rigid with said two pairs.

16. A gear drive according to claim 15, wherein one of the named elements contains two sets of helical gear teeth internally provided thereon, said sets being of opposite hand and equal lead and meshing with gears of said two pairs respectively, said two pairs are rotatably mounted on opposite eccentric portions of the named third element to jointly float axially, so that their axial position is determined by said opposite helical gear teeth and the load is shared equally by both pairs.

17. A gear drive according to claim 1, wherein the named third element is maintained stationary in normal operation.

References Cited
UNITED STATES PATENTS

| | | | |
|---|---|---|---|
| 2,026,880 | 1/1936 | Fliesberg et al. | 74—805 |
| 3,013,447 | 12/1961 | Hils et al. | 74—805 |
| 3,052,138 | 9/1962 | Louton et al. | 74—805 |
| 3,073,184 | 1/1963 | Braren | 74—804 |
| 3,160,026 | 12/1964 | Rosen | 74—801 X |
| 3,178,966 | 4/1965 | Wildhaber | 74—801 |
| 3,255,840 | 6/1966 | Tangen | 74—805 X |
| 3,369,672 | 2/1968 | Lorence | 74—805 X |

ARTHUR T. McKEON, Primary Examiner

U.S. Cl. X.R.

74—410